United States Patent
Jones et al.

(10) Patent No.: US 7,724,548 B2
(45) Date of Patent: May 25, 2010

(54) CONTROL METHODS FOR PULSE WIDTH MODULATION (PWM)

(75) Inventors: Rodney Jones, Stoke On Trent (GB); Robert Vernon Fulcher, Stoke on Trent (GB); Eric Anthony Lewis, Rugby (GB)

(73) Assignee: Converteam UK Ltd, Warwickshire (GB)

( * ) Notice: Subject to any disclaimer, the term of this patent is extended or adjusted under 35 U.S.C. 154(b) by 296 days.

(21) Appl. No.: 11/897,067

(22) Filed: Aug. 29, 2007

(65) Prior Publication Data

US 2008/0062728 A1    Mar. 13, 2008

(30) Foreign Application Priority Data

Sep. 2, 2006  (GB) .............................. 0617371.0

(51) Int. Cl.
*H02M 5/458* (2006.01)
(52) U.S. Cl. .......................... 363/37; 363/41
(58) Field of Classification Search ............. 363/34–41, 363/95, 98, 132; 323/271–276, 282, 283, 323/284; 318/471, 537, 809, 811, 798, 700
See application file for complete search history.

(56) References Cited

U.S. PATENT DOCUMENTS

| 6,088,246 | A  | * | 7/2000 | Okuyama et al. ............. 363/41 |
| 6,134,127 | A  |   | 10/2000 | Kirchberg |
| 6,256,212 | B1 |   | 7/2001 | Wobben |
| 6,366,067 | B1 | * | 4/2002 | Zhang et al. ................ 323/282 |

* cited by examiner

*Primary Examiner*—Rajnikant B Patel
(74) *Attorney, Agent, or Firm*—Kirschstein, et al.

(57) ABSTRACT

A method of controlling a power converter is used to interface to a power grid or supply network operating at a frequency (Fnet) that is nominally fixed (say at 50 Hz, for example) but which can be varied as a way of controlling power imbalanced within the network as a whole. The power converter can include a network bridge that operates in accordance with the pulse width modulation (PWM) strategy having a switching frequency (Fpwm), a nominal switching frequency (Fpwm_nom) and a number of pulses per period (Pulse_Number). The method includes the step of varying the switching frequency (Fpwm) of the PWM strategy in accordance with the time-varying frequency (Fnet) of the supply network to achieve only integer odd harmonics of the time-varying frequency (Fnet) and the step of adjusting the number of pulses per period (Pulse_Number) in accordance with the time-varying frequency (Fnet) of the supply network to maintain a switching frequency (Fpwm) that is less than, or equal to, the nominal switching frequency (Fpwm_nom).

27 Claims, 3 Drawing Sheets

CONTROL METHODS FOR PULSE WIDTH MODULATION (PWM)

FIELD OF THE INVENTION

The present invention relates to methods for controlling a pulse width modulation (PWM) strategy. The methods have particular application for network bridges that are used as part of a power converter to interface generators providing variable voltage at variable frequency to a power grid or supply network at nominally fixed voltage and frequency. However, the methods can also be used for network bridges that are used as part of a power converter to interface a motor requiring variable voltage at variable frequency to a supply network (ac bus bar) at nominally fixed voltage and frequency.

BACKGROUND OF THE INVENTION

It is possible to convert wind energy to electrical energy by using a wind turbine to drive the rotor of a generator, either directly or by means of a gearbox. The ac frequency that is developed at the stator terminals of the generator (the "stator voltage") is directly proportional to the speed of rotation of the rotor. The voltage at the generator terminals also varies as a function of speed and, depending on the particular type of generator, on the flux level. For optimum energy capture, the speed of rotation of the output shaft of the wind turbine will vary according to the speed of the wind driving the turbine blades. To limit the energy capture at high wind speeds, the speed of rotation of the output shaft is controlled by altering the pitch of the turbine blades. Matching of the variable voltage and frequency of the generator to the nominally fixed voltage and frequency of the supply network can be achieved by using a power converter.

The power converter typically includes a generator bridge, which in normal operation operates as an active rectifier to supply power to a dc link. The generator bridge can have any suitable topology with a series of semiconductor power switching devices fully controlled and regulated using a pulse width modulation (PWM) strategy.

The dc output voltage of the generator bridge is fed to the dc terminals of a network bridge, which in normal operation operates as an active inverter. The principal control for the dc output voltage is achieved by controlling the generator bridge. The network bridge can have any suitable topology with a series of semiconductor power switching devices fully controlled and regulated using a PWM strategy.

The ac output voltage of the network bridge is filtered and supplied to the nominally fixed frequency supply network via a step-up transformer. Protective switchgear can be included to provide a reliable connection to the supply network and to isolate the generator system from the supply network for various operational and non-operational requirements.

The power grid or supply network will operate at a nominally fixed voltage and frequency, although the latter will almost certainly vary between upper and lower limits defined in the various standards and grid codes. Such frequency variations result from power imbalances within the overall network—if load power is in excess of generated power then the frequency will fall and vice versa. Connected equipment, including that covered by the present invention, has to be able to track such frequency changes.

The PWM strategy used in the network bridge will typically operate at a given switching frequency. The mixing between the nominally fixed frequency of the power grid or supply network and the switching frequency of the PWM strategy will cause harmonics in the ac output voltage of the network bridge. In the general case, for a PWM strategy with a switching frequency Fpwm and a nominally fixed frequency of the supply network Fnet then it can be shown that significant harmonics are created at frequencies given by:

$$Fpwm \pm 2N \ast Fnet$$

particularly in cases where N=1 and N=2.

If Fpwm is chosen such that:

$$Fpwm = (2M-1) \ast Fnet$$

where M is an integer (i.e., Fpwm is an integer odd multiple of Fnet) then significant harmonics will now appear at:

$$[(2M-1) \pm 2N] \ast Fnet$$

This means that the significant harmonics are at integer odd multiples of Fnet.

The above equations can also be explained as follows: if the nominally fixed frequency (Fnet) of the supply network is 50 Hz and the switching frequency of the PWM strategy (Fpwm) is 2.5 kHz then significant harmonics are created at 2.3 kHz, 2.4 kHz, 2.6 kHz and 2.7 kHz (i.e., 46, 48, 52 and 54 times the nominally fixed frequency of the supply network).

It is generally accepted that integer odd harmonics are preferable to integer even harmonics such as those mentioned above. This is because the allowable emissions exported into the supply network can be higher for integer odd harmonics than for integer even harmonics. For example, in the widely applied harmonics standard IEEE 519-1992 entitled "IEEE Recommended Practices and Requirements for Harmonic Control in Electrical Power Systems" the limits on current distortion for integer even harmonics are restricted to 25% of the limits for integer odd harmonics. Non-integer harmonics (or "interharmonics") are also to be generally avoided because they can cause unwanted disturbances in electrical appliances connected to the supply network. The non-integer harmonics can also interfere with control signals that are sometimes broadcast in the interharmonic region.

One way of making sure that the mixing between the nominally fixed frequency of the power grid or supply network and the switching frequency of the PWM strategy only produces integer odd harmonics in the ac output voltage of the network bridge is to select a particular switching frequency for the PWM strategy. If the nominally fixed frequency (Fnet) of the supply network is 50 Hz then the switching frequency of the PWM strategy (Fpwm) can be set to 2.45 kHz. Significant harmonics are then created at 2.25 kHz, 2.35 kHz, 2.55 kHz and 2.65 kHz (i.e., 45, 47, 51 and 53 times the nominally fixed frequency of the supply network).

However, this solution does not take into account the fact that the nominally fixed frequency of the supply network will vary as result of power imbalances within the overall network. To this extent, the power grid or supply network must to considered to operate at a time-varying frequency even though the upper and lower limits of the variation are typically no more than about ±0.5 Hz and the changes take place gradually over the course of a number of hours or longer. However, in extreme cases, the upper and lower limits of the variation may be as much as ±3.0 Hz.

Even if the switching frequency is allowed to vary according to the time-varying frequency of the power grid or supply network then this can cause problems because the network bridge will typically have a maximum switching frequency that cannot be exceeded for thermal reasons. Extreme variations in the time-varying frequency may therefore result in a switching frequency that is higher than the maximum switching frequency such that the network bridge experiences unacceptably high thermal losses in its semiconductor switching devices.

In some cases, the choice of filter for filtering the ac output voltage of the network bridge can also place limits on the range of allowable switching frequencies for the PWM strategy. This is particularly true for tuned inductor and capacitor (LC) filters.

An improved PWM strategy for a network bridge is therefore needed.

SUMMARY OF THE INVENTION

The present invention provides a method of controlling a power converter that can be used to interface to a supply network operating at a time-varying frequency, the power converter comprising a network bridge operating in accordance with a pulse width modulation (PWM) strategy having a switching frequency, a nominal switching frequency and a number of pulses per period, the method comprising the step of varying the switching frequency of the PWM strategy in accordance with the time-varying frequency of the supply network to achieve only integer harmonics of the time-varying frequency.

The term "period" is used herein to refer to the period of the fundamental frequency of the voltage waveform of the supply network.

The term "integer harmonic" is used herein to cover both a harmonic that is an exact integer harmonic value and also a harmonic that is within an agreed tolerance of the exact integer harmonic value. The agreed tolerance (typically in the region of ±5 Hz, for example) will usually be set or determined by the supply network operator or defined in some standard.

For example, with a supply network operating at a nominally fixed frequency of 50 Hz, a harmonic at 2.25 kHz (i.e., 45 times the nominally fixed frequency) would be an odd integer harmonic while, strictly speaking, a harmonic at 2.25005 kHz (i.e., 45.001 times the nominally fixed frequency) would be a non-integer harmonic (or "interharmonic"). However, since the harmonic value of 2.25005 kHz is within an agreed tolerance of the exact harmonic value of 2.25 kHz it should therefore be considered to be an odd integer harmonic for the purposes of the present invention.

The method may also include a "gearing" step of adjusting the number of pulses per period in accordance with the time-varying frequency of the supply network to maintain the highest switching frequency that is less than, or equal to, the nominal switching frequency. The number of pulses per period is preferably adjusted in a series of discrete steps.

The nominal switching frequency will usually be selected as the worst case rating point for the power converter components.

The method may include a "hysteresis" step to prevent the number of pulses per period being adjusted too often if the time-varying frequency of the supply network "jitters" about a particular frequency. For example, if there are a certain number of pulses per period when the time-varying frequency of the supply network is less than, or equal to, a particular value and this number is reduced when the time-varying frequency of the supply network is greater than the particular value, then the method may prevent the number of pulses per period from being adjusted if the time-varying frequency of the supply network only undergoes small movements about the particular value. In other words, the method may require a minimum amount of movement in the time-varying frequency from the particular value before the number of pulses per period is adjusted.

Figure 3:
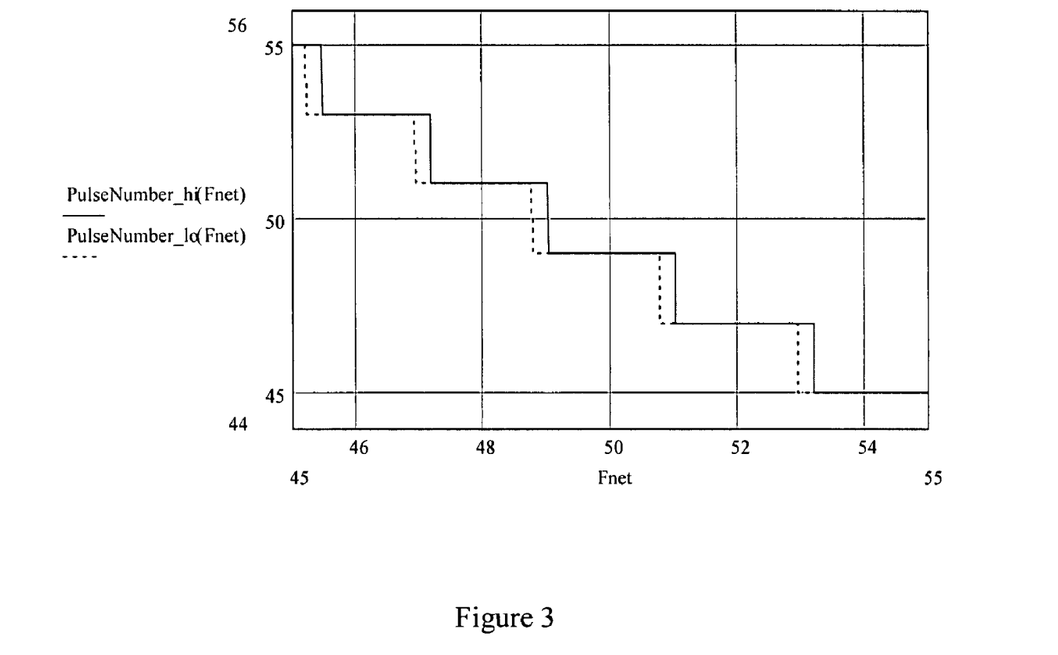
FIG. 3 is a graph of frequency of the power grid versus the number of pulses per period of a PWM strategy.
Figure 4:
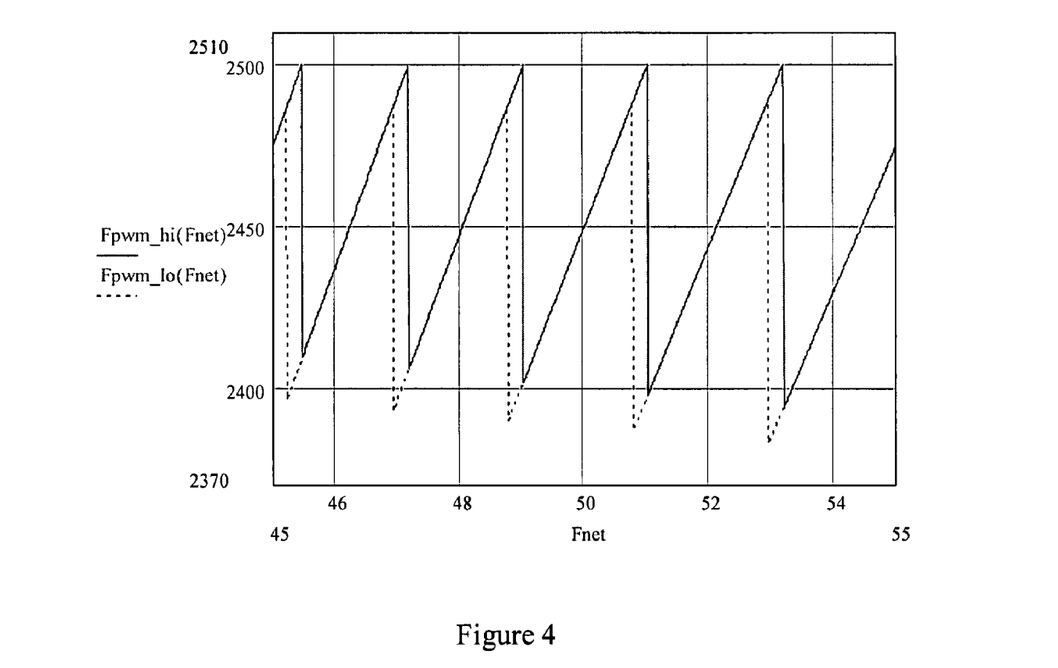
FIG. 4 is a graph of frequency of the power grid versus the switching frequency of the PWM strategy.

It is possible, with reference to FIGS. 3 and 4, to define the present invention further in terms of how the number of pulses per period of a PWM strategy and the switching frequency of the PWM strategy vary according to the changes in the frequency of the supply network or power grid.

More particularly, the number of pulses per period is preferably adjusted at each of a first series of discrete frequency values of the supply network when the time-varying frequency of the supply network is increasing and at each of a second series of discrete frequency values of the supply network when the time-varying frequency of the supply network is decreasing. In this case, the number of pulses per period varies with a "stepped" pattern. The first series of discrete frequency values of the supply network and the second series of discrete frequency values of the supply network can be the same but can also be offset relative to each other to provide the "hysteresis" step mentioned above. If the first and second series of discrete frequency values are offset relative to each other then this effectively results in two different "stepped patterns" for the variation of the number of pulses: one that is followed when the time-varying frequency of the supply network is increasing and another that is followed when the time-varying frequency of the supply network is decreasing.

The switching frequency of the PWM strategy preferably varies discretely from an upper value to a lower value and then gradually (optionally in a linear manner) back to the upper value when the time-varying frequency of the supply network is increasing. This sequence is repeated to provide a generally "saw-tooth" pattern in the variation of the switching frequency of the PWM strategy. The upper value can be substantially equal to the nominal switching frequency of the PWM strategy. However, the switching frequency of the PWM strategy preferably varies gradually (optionally in a linear manner) from an upper value down to a lower value and then discretely back to the upper value when the time-varying frequency of the supply network is decreasing.

The switching frequency of the PWM strategy preferably varies discretely from an upper value to a lower value at each of a first series of discrete frequency values of the supply network when the time-varying frequency of the supply network is increasing and the switching frequency of the PWM strategy varies discretely from a lower value to an upper value at each of a second series of discrete frequency values of the supply network when the time-varying frequency of the supply network is decreasing. The first series of discrete frequency values of the supply network and the second series of discrete frequency values of the supply network can be offset relative to each other to provide the "hysteresis" step mentioned above. This effectively results in two different "saw-tooth patterns" for the variation of the switching frequency of the PWM strategy: one that is followed when the time-varying frequency of the supply network is increasing and another that is followed when the time-varying frequency of the supply network is decreasing.

The present invention further provides a controller for a power converter that can be used to interface to a supply network operating at a time-varying frequency, the power converter comprising a network bridge operating in accordance with a pulse width modulation (PWM) strategy having a switching frequency, a nominal switching frequency and a number of pulses per period, the controller arranged to vary the switching frequency of the PWM strategy in accordance with the time-varying frequency of the supply network to achieve only integer harmonics of the time-varying frequency.

The controller may be arranged to include the "gearing" and "hysteresis" steps outlined above. The above definition of the present invention in terms of how the number of pulses per period of a PWM strategy and the switching frequency of the PWM strategy vary according to the frequency of the supply network or power grid is also applicable to the controller.

The switching frequency of the PWM strategy can be varied to achieve only integer odd harmonics of the time-varying frequency because these are generally preferable to integer even harmonics for the reasons mentioned above. However, the method and controller can be used to achieve only integer even harmonics if this is necessary for any given application.

The power converter can be used for both motoring and generating applications. For example, the power converter can be used to interface a generator to a supply network or power grid. In this case the network bridge will normally be operating as an active inverter. The power converter can also be used to interface a motor to a supply network (ac bus bar). In this case the network bridge will normally be operating as an active rectifier.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
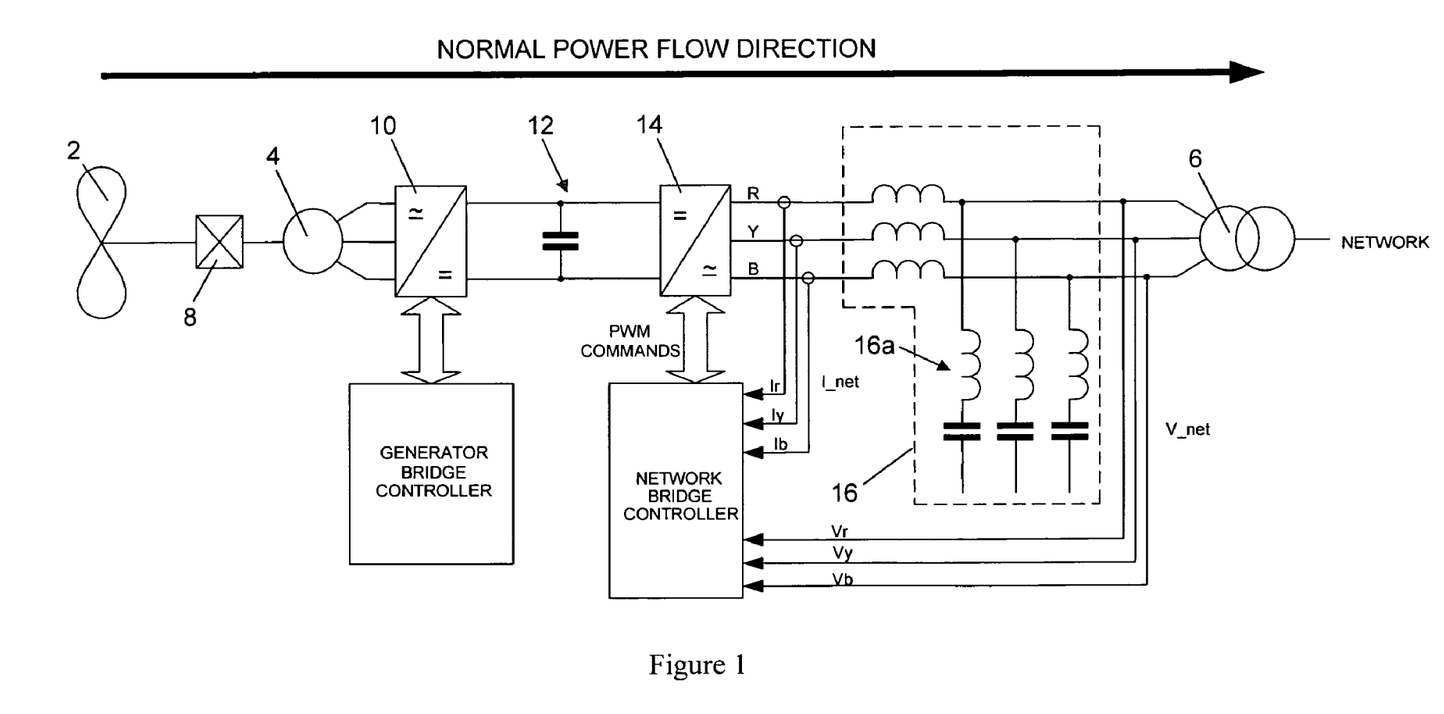
FIG. 1 is a schematic drawing of a power converter for a wind turbine having a network bridge operating with a pulse width modulation (PWM) strategy that is controlled in accordance with the present invention.

The basic topology of a power converter for wind turbine applications will be outlined with reference to FIG. 1.

In the basic topology of FIG. 1 the power converter is used to interface between a wind turbine 2 driving a variable speed ac induction generator 4 and a supply network (labelled NETWORK). The wind turbine typically includes three turbine blades (although one turbine blade or two turbine blades or more than three turbine blades are also possible) mounted on a rotating shaft and whose pitch can be controlled by means of a pitch actuator in order to optimise and/or limit the capture of wind energy into the generator 4. A gearbox 8 is used to connect the rotating shaft to the rotor of the variable speed generator 4. In some cases, the rotating shaft can be connected directly to the rotor of the variable speed generator.

The terminals of the generator 4 are connected to the ac terminals of a three-phase generator bridge 10 which in normal operation operates as an active rectifier to supply power to a dc link 12. The generator bridge 10 has a conventional three-phase two-level topology with a series of semiconductor power switching devices fully controlled and regulated using a pulse width modulation (PWM) strategy. However, in practice the generator bridge 10 can have any suitable topology such a three-level neutral point clamped topology or a multi-level topology (Foch-Maynard arrangement, for example).

The dc output voltage of the generator bridge 10 is fed to the dc terminals of a network bridge 14 which in normal operation operates as an inverter. The network bridge 14 has a similar three-phase two-level topology to the generator bridge 10 with a series of semiconductor power switching devices fully controlled and regulated using a PWM strategy. However, in practice the network bridge 14 can have any suitable topology, as discussed above for the generator bridge 10. A suitable network bridge 14 would be the ALSPA MV3000 inverter available from Converteam Ltd of Boughton Road, Rugby, Warwickshire, CV21 1BU, United Kingdom.

The ac output voltage of the network bridge 14 is filtered by a network filter 16 that includes a tuned inductor and capacitor (LC) filter 16a before being supplied to the supply network via a step-up transformer 6. Protective switchgear (not shown) can be included to provide a reliable connection to the supply network and to isolate the generator system from the supply network for various operational and non-operational requirements.

Figure 2:
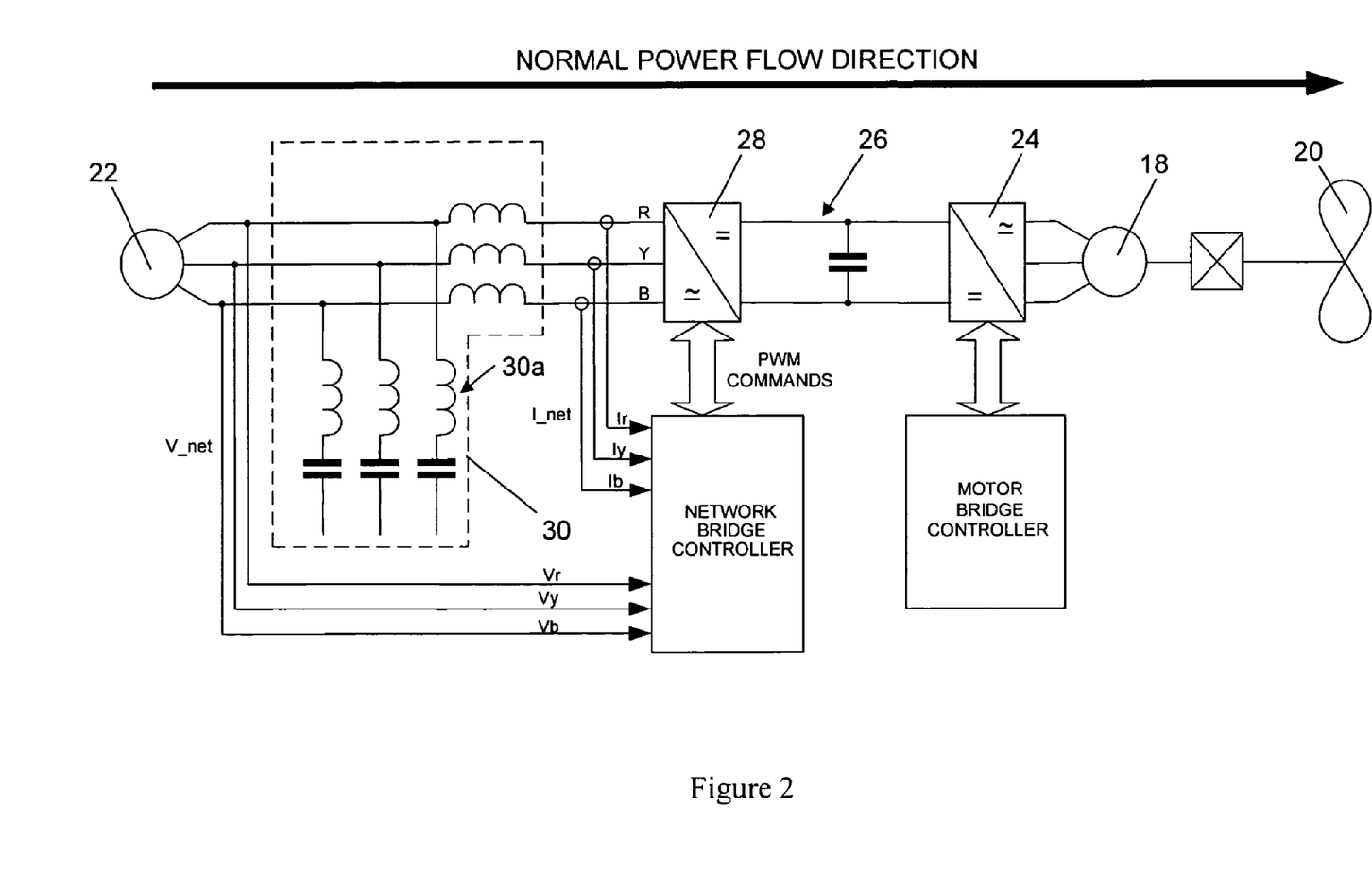
FIG. 2 is a schematic drawing of a power converter for a marine propulsion drive having a network bridge operating with a PWM strategy that is controlled in accordance with the present invention.

Although the rest of this description focuses on the use of a power converter for wind turbine applications, it will be obvious to the skilled person that the invention has wider applicability. For example, with reference to FIG. 2, the power converter can be used for marine propulsion drive applications to interface between a motor 18 that forms part of a thruster drive having a propeller 20 and an ac bus bar 22 (ship power supply network). A network bridge 28 is connected to the ac bus bar 22 via a filter 30 that includes a tuned LC filter 30a. The network bridge 28 operates as an active rectifier to supply power from the ac bus bar 22 to a dc link 26. The terminals of the motor 18 are connected to the ac terminals of a motor bridge 24 which in normal operation operates as an active inverter to supply power to the motor from the dc link 26. If the network bridge 28 includes a series of semiconductor power switching devices fully controlled and regulated using a PWM strategy then the switching frequency of this PWM strategy can be adjusted using the method described below to achieve improved compatibility with the power supplied from the ac bus bar 22.

It is assumed that the frequency of the supply network for wind turbine applications has a nominally fixed frequency of 50 Hz but that this will vary between upper and lower limits (in extreme cases as much as ±3.0 Hz) defined in the various grid standards and grid codes that occur as a result of power imbalances within the overall network. It is also assumed for the purposes of the ALSPA MV3000 inverter that the network bridge 14 is operated according to a PWM strategy with a nominal (maximum) switching frequency of 2.5 kHz. However, to benefit from the more significant allowance permitted for integer odd harmonics, the actual switching frequency of the PWM strategy is adjusted in accordance with any variation in the frequency of the supply network. The number of pulses per period of the PWM strategy is also adjusted to make sure the actual switching frequency is constrained within a certain range and does not exceed the nominal switching frequency of 2.5 kHz.

The time-varying frequency of the supply network is defined as Fnet and can be determined in several different ways. In one possible implementation Fnet can be determined by using a phase locked loop system to monitor the voltage phases Vry, Vyb and Vby of the supply network and by using a three-phase voltage to two-axis converter operating in a rotating reference frame to produce the direct axis and quadrature axis voltage components of the supply network voltage. The direct axis voltage component is fed into a first integrator whose output is a signal proportional to Fnet. The output of the first integrator is fed into a second integrator with a reset to zero triggered when the output has an effective amplitude of 2π. This results in a sawtooth waveform with an effective amplitude of 2π and a period equal to the frequency of the supply network. This sawtooth waveform is the signal that is used by the three-phase to two-axis converter as its rotating reference frame. When the phase locked loop system is correctly locked to the voltage waveform of the supply network and the supply network is operating at a constant frequency, the output signal of the first integrator is a fixed value proportional to Fnet. Other ways of determining Fnet will be known to the skilled person and these can be used with the present invention.

A possible algorithm to, determine the number of pulses per period of the PWM strategy (Pulse_Number) from a prevailing Fnet, whilst at the same time respecting the maximum switching frequency of the PWM strategy (Fpwm_nom) and using a hysteresis window is given below.

$$\text{Pulse\_Number\_hi} = 2 * \text{ROUND}\left(\frac{\text{Fpwm\_nom}}{2 * \text{Fnet}}\right) - 1 \quad \text{(Equation 1)}$$

$$\text{Pulse\_Number\_lo} = 2 * \text{ROUND}\left(\frac{\text{Fpwm\_nom}}{2 * (\text{Fnet} + \text{HYSTERESIS})}\right) - 1 \quad \text{(Equation 2)}$$

where ROUND represents a mathematical function that converts the result of the bracketed expression to the nearest integer and HYSTERESIS represents a hysteresis value of Fnet around the changes in Pulse_Number and for the purposes of the following description is 0.25 Hz.

The algorithm produces two values for the Pulse_Number (i.e., Pulse_Number_hi and Pulse_Number_lo) and a further decision must then be made to select which of the values to use. If both of the values are the same then this value is selected as the Pulse_Number. This will be the case when the value of Fnet is such that the two traces of FIG. 3 are coincident with each other. However, if the two values differ then the value that is selected as the Pulse_Number is the value that is the same as the Pulse_Number selected during the previous iteration of the algorithm. This will be the case when the value of Fnet is such that the two traces of FIG. 3 are separated by the hysteresis windows.

For the first iteration of the algorithm where Fnet is 50.0 Hz and Fpwm_nom is 2.5 kHz then both Pulse_Number_hi and Pulse_Number_lo will be 49. The selected value for the Pulse_Number will therefore be 49. The actual switching frequency (Fpwm) of the PWM strategy for the network bridge 14 can then be determined according to the following equation:

$$\text{Fpwm} = \text{Pulse\_Number} * \text{Fnet} \quad \text{(Equation 3)}$$

If Pulse_Number is 49 then Fpwm is set to 2.450 kHz. Significant harmonics are then created at 2.250 kHz, 2.350 kHz, 2.550 kHz and 2.650 kHz (i.e., 45, 47, 51 and 53 times Fnet since the principal harmonics produced by a double-edged modulated PWM strategy are Fpwm±2*Fnet and Fpwm±4*Fnet where N is a low integer).

Although the Pulse_Number will only vary in discrete steps because of the ROUND function of Equations 1 and 2, Fnet will typically vary in a gradual and continuous manner (a general upward or downward "drift" from the nominally fixed frequency of 50 Hz) and this means that Fpwm will also vary in a continuous manner. The control of the PWM strategy therefore takes the form of a gradual variation in Fpwm for the ranges of Fnet where the Pulse_Number remains the same, with stepped variations occurring at values of Fnet where the Pulse_Number is discretely adjusted.

If we consider the second iteration of the algorithm where Fnet has increased to 50.5 Hz and Fpwm_nom is 2.5 kHz then the bracketed expression of Equation 1 is 24.75, which is converted to the nearest integer 25 by the ROUND function. Pulse_Number_hi will remain at 49. The bracketed expression of Equation 2 is 24.63, which is converted to the nearest integer 25 by the ROUND function. Pulse_Number_lo will remain at 49. Pulse_Number_hi and Pulse_Number_lo are the same and the selected Pulse_Number will be 49. However, the change in Fnet means that Fpwm of the PWM strategy will increase to 2.475 kHz.

If we consider the third iteration of the algorithm where Fnet has increased to 51.0 Hz and Fpwm_nom is 2.5 kHz then the bracketed expression of Equation 1 is 24.51, which is converted to the nearest integer 25 by the ROUND function. Pulse_Number_hi will remain at 49. The bracketed expression of Equation 2 is 24.39, which is converted to the nearest integer 24 by the ROUND function. Pulse_Number_lo will therefore be 47. As Pulse_Number_hi and Pulse_Number_lo are different, the selected value for the Pulse_Number will be the value that was selected during the second iteration of the algorithm, namely 49. The change in Fnet means that Fpwm of the PWM strategy will increase to 2.499 kHz. Fpwm is approaching Fpwm_nom and with a value of 24.51 the bracketed expression of Equation 1 is approaching the point where it can be converted down to the nearest integer 24 by the ROUND function. The control of the PWM strategy is therefore almost at the point where Pulse_Number will be discretely adjusted.

Thus, if we consider the fourth iteration of the algorithm where Fnet has increased to 51.1 Hz and Fpwm_nom is 2.5 kHz then the bracketed expression of Equation 1 is 24.46, which is converted to the nearest integer 24 by the ROUND function. Pulse_Number_hi is adjusted from 49 to 47. The bracketed expression of Equation 2 is 24.34, which is converted to the nearest integer 24 by the ROUND function. Pulse_Number_lo will therefore be 47. Pulse_Number_hi and Pulse_Number_lo are now the same and the selected Pulse_Number will be 47. Fpwm of the PWM strategy undergoes a stepped variation from about 2.5 kHz to 2.402 kHz. The significant harmonics are now at 2.197 kHz, 2.299 kHz, 2.5039 kHz and 2.606 kHz (i.e., 43, 45, 49 and 51 times Fnet).

If the Pulse_Number had not been discretely adjusted from 49 to 47 then it can be seen from Equation 3 that for an Fnet of 51.1 Hz the actual switching frequency (Fpwm) of the PWM strategy would be 2.504 kHz. This is greater than the nominal (maximum) switching frequency of the PWM strategy (Fpwm_nom) and the network bridge 14 would have been allowed to stray beyond its thermal limits.

FIG. 3 shows how the number of pulses per period of the PWM strategy (Pulse_Number) varies as a function of the frequency of the supply network (Fnet). Although in FIGS. 3 and 4 Fnet is shown to vary between 45 Hz and 55 Hz it will be readily appreciated that the variations in Fnet (assuming a nominally fixed frequency of 50 Hz) are unlikely to be this extreme in practice. However, an upper and lower limit of 45 Hz and 55 Hz, respectively, are useful in showing the stepped adjustment of the number of pulses per period and the gradual and stepped variations in the actual switching frequency of the PWM strategy (Fpwm) over a wide range of frequencies.

FIG. 3 shows two distinct traces. The first trace in unbroken line is labelled "Pulse_Number_hi" and represents the higher of the two values for the number of pulses per period of the PWM strategy (i.e., the value provided by Equation 1). The second trace in short chain line is labelled "Pulse_Number_lo" and represents the lower of the two values for the number of pulses per period of the PWM strategy (i.e., the value provided by Equation 2).

Starting at Fnet of 50 Hz then it can be readily seen that in the situation where Fnet is increasing the first trace can be followed and the number of pulses per period of the PWM strategy will remain constant at 49 until Fnet reaches about 51 Hz at which point it reduces in a discrete step to 47. If Fnet continues to increase then the number of pulses per period of the PWM strategy will remain constant at 47 until Fnet reaches about 53 Hz at which point it reduces in a discrete step to 45.

Starting at Fnet of between about 51 and about 53 Hz (i.e., where first and second traces are coincident with each other and the number of pulses per period of the PWM strategy is 47) then it can be readily seen that in the situation where Fnet is decreasing then the second trace can be followed. The hysteresis value of 0.25 Hz included in Equation 2 therefore effectively decreases the Fnet at which the adjustment of the number of pulses per period of the PWM strategy will occur. In other words, instead of the number of pulses per period of the PWM strategy increasing from 47 to 49 in a discrete step when Fnet reaches about 51 Hz, the number of pulses per period will remain constant at 47 until Fnet reaches about 50.75 Hz at which point it increases in a discrete step to 49. This prevents the number of pulses per period of the PWM strategy from changing back and forth between 47 and 49 if Fnet "jitters" about 51 Hz (or about any other of the values of Fnet where a discrete step in the number of pulses per period of the PWM strategy occurs).

FIG. 4 shows how the actual switching frequency of the PWM strategy undergoes both gradual and stepped variations as a function of the frequency of the supply network (Fnet). This is referred to generally as the "gearing" of the actual switching frequency of the PWM strategy and ensures that the actual switching frequency is maintained as high as possible while still being less than, or equal to, the nominal switching frequency of the PWM strategy (Fpwm_nom) across a wide range of Fnet. FIG. 4 shows two distinct traces. The first trace in unbroken line is labelled "Fpwm_hi" and represents the actual switching frequency of the PWM strategy in the situation where Fnet is increasing (i.e., using the value of Pulse_Number_hi given by Equation 1). The second trace in short chain line is labelled "Fpwm_lo" and represents the actual switching frequency of the PWM strategy in the situation where Fnet is decreasing (i.e., using the value of Pulse_Number_lo given by Equation 2).

Starting at Fnet of 50 Hz then it can be readily seen that in the situation where Fnet is increasing the first trace can be followed and the actual switching frequency of the PWM strategy (Fpwm_hi) increases gradually and in a linear manner from 2.450 kHz to the nominal switching frequency (Fpwm_nom) of 2.5 kHz. When Fnet reaches about 51.1 Hz (which is also when Fpwm_hi reaches the nominal switching frequency of 2.5 kHz), the number of pulses per period of the PWM strategy (Pulse_Number) is adjusted from 49 to 47. At this point, Fpwm_hi undergoes a stepped variation from the nominal switching frequency of 2.5 kHz to a minimum frequency of 2.402 kHz. Fpwm_hi then starts to increase gradually and in a linear manner from the minimum frequency of 2.402 kHz back to the nominal switching frequency of 2.5 kHz. The stepped variation from the nominal switching frequency of 2.5 kHz to a minimum frequency and the gradual and linear increase back to the nominal switching frequency represents a single transition. Each transition occurs over the range of Fnet during which the number of pulses per period of the PWM strategy remains constant when Pulse_Number is the same as Pulse_Number_hi provided by Equation 1 (i.e., when following the first trace of FIG. 3).

Starting at Fnet of 50 Hz then it can be readily seen that in the situation where Fnet is decreasing the second trace can be followed and the actual switching frequency of the PWM strategy (Fpwm_lo) decreases gradually and in a linear manner from 2.450 kHz to a minimum frequency of 2.391 kHz. When Fnet reaches about 48.8 Hz (which is also when Fpwm_lo reaches the minimum frequency of 2.391 kHz), the number of pulses per period of the PWM strategy (Pulse_Number) is adjusted from 49 to 51. At this point, Fpwm_lo undergoes a stepped variation from the minimum frequency of 2.391 kHz to a maximum frequency of 2.485 kHz that is less than the nominal switching frequency (Fpwm_nom) of 2.5 kHz. Fpwm_lo then starts to decrease gradually and in a linear manner from the maximum frequency of 2.485 kHz back to a minimum frequency of 2.401 kHz. The stepped variation from the maximum frequency of 2.485 kHz to a minimum frequency and the gradual and linear increase back to the maximum frequency represents a single transition. Each transition occurs over the range of Fnet during which the number of pulses per period of the PWM strategy remains constant when Pulse_Number is the same as Pulse_Number_lo provided by Equation 2 (i.e., when following the second trace of FIG. 3).

Controlling the PWM strategy of the network bridge 14 in the manner described above provides three principal technical advantages.

Firstly, it ensures that the actual switching frequency (Fpwm) of the PWM strategy can vary in accordance with the frequency of the supply network (Fnet) in such a way that only integer odd harmonics of Fnet are produced. Secondly, Fpwm can be maintained within the thermal limits of the network bridge 14 while still having the highest possible switching frequency that the hardware can support. In other words, without the stepped variations in the number of pulses per period of the PWM strategy (Pulse_Number), an increase in Fnet might cause the Fpwm to exceed the nominal (maximum) switching frequency (Fpwm_nom) taking the network bridge 14 beyond its thermal limits. Thirdly, the stepped variations in the number of pulses per period of the PWM strategy places fixed constraints on the upper and lower limits on Fpwm. As seen in FIG. 3, for the range of Fnet from 45 Hz to 55 Hz, Fpwm_hi can only vary between a minimum of 2.385 kHz and the nominal switching frequency (Fpwm_nom) of 2.5 kHz. Over the same range of Fnet, Fpwm_lo can only vary between a minimum of 2.375 kHz and a maximum frequency of 2.485 kHz. This is important if the power converter is used in conjunction with a tuned LC filter (i.e., a filter that contains both inductive and capacitive components) because they only work effectively over a relatively narrow range of frequencies. The tuned LC filters 16a and 30a shown in FIGS. 1 and 2, respectively, can therefore be specifically chosen to operate within the upper and lower limits of Fpwm_lo and Fpwm_hi.

It will be readily appreciated that the above description is merely for the purposes of describing one way of putting the present invention into effect and should not be considered to be limiting. For example, the nominally fixed frequency (Fnet) of the supply network can have any suitable value—the supply network in North America operates at a nominally fixed frequency of 60 Hz rather than the 50 Hz mentioned above. The nominal (maximum) switching frequency of the PWM strategy (Fpwm_nom) can have any suitable value and may depend on the topology of the network bridge 14.

Any suitable algorithm can be used to control the PWM strategy of the network bridge 14 to achieve the principal technical advantages mentioned above.

What is claimed is:

1. A method of controlling a power converter that can be used to interface to a supply network operating at a time-varying frequency, the power converter comprising a network bridge operating in accordance with a pulse width modulation (PWM) strategy having a switching frequency, a nominal switching frequency and a number of pulses per period, the method comprising the step of: varying the switching frequency of the PWM strategy in accordance with the time-varying frequency of the supply network to achieve only integer harmonics of the time-varying frequency.

2. The method according to claim 1, further comprising the step of adjusting the number of pulses per period in accordance with the time-varying frequency of the supply network to maintain the highest switching frequency that is less than, or equal to, the nominal switching frequency.

3. The method according to claim 2, wherein the number of pulses per period is adjusted in a series of discrete steps.

4. The method according to claim 2, wherein the number of pulses per period is adjusted at each of a first series of discrete frequency values of the supply network when the time-varying frequency of the supply network is increasing and at each of a second series of discrete frequency values of the supply network when the time-varying frequency of the supply network is decreasing.

5. The method according to claim 4, wherein the first series of discrete frequency values of the supply network and the second series of discrete frequency values of the supply network are offset relative to each other.

6. The method according to claim 2, wherein the switching frequency of the PWM strategy varies discretely from an upper value to a lower value and then gradually back to the upper value when the time-varying frequency of the supply network is increasing.

7. The method according to claim 6, wherein the upper value is substantially equal to the nominal switching frequency of the PWM strategy.

8. The method according to claim 6, wherein the switching frequency of the PWM strategy varies gradually from an upper value down to a lower value and then discretely back to the upper value when the time-varying frequency of the supply network is decreasing.

9. The method according to claim 8, wherein the switching frequency of the PWM strategy varies discretely from an upper value to a lower value at each of a first series of discrete frequency values of the supply network when the time-varying frequency of the supply network is increasing and the switching frequency of the PWM strategy varies discretely from a lower value to an upper value at each of a second series of discrete frequency values of the supply network when the time-varying frequency of the supply network is decreasing.

10. The method according to claim 9, wherein the first series of discrete frequency values of the supply network and the second series of discrete frequency values of the supply network are offset relative to each other.

11. The method according to claim 1, wherein the switching frequency of the PWM strategy is varied to achieve only integer odd harmonics of the time-varying frequency.

12. The method according to claim 1, wherein the switching frequency of the PWM strategy is varied to achieve only integer even harmonics of the time-varying frequency.

13. A controller for a power converter that can be used to interface to a supply network operating at a time-varying frequency, the power converter comprising a network bridge operating in accordance with a pulse width modulation (PWM) strategy having a switching frequency, a nominal switching frequency and a number of pulses per period, the controller being arranged to vary the switching frequency of the PWM strategy in accordance with the time-varying frequency of the supply network to achieve only integer harmonics of the time-varying frequency.

14. The controller according to claim 13, wherein the controller is arranged to adjust the number of pulses per period in accordance with the time-varying frequency of the supply network to maintain the highest switching frequency that is less than, or equal to, the nominal switching frequency.

15. The controller according to claim 14, wherein the controller is arranged to adjust the number of pulses per period in a series of discrete steps.

16. The controller according to claim 14, wherein the number of pulses per period is adjusted at each of a first series of discrete frequency values of the supply network when the time-varying frequency of the supply network is increasing and at each of a second series of discrete frequency values of the supply network when the time-varying frequency of the supply network is decreasing.

17. The controller according to claim 16, wherein the first series of discrete frequency values of the supply network and the second series of discrete frequency values of the supply network are offset relative to each other.

18. The controller according to claim 14, wherein the switching frequency of the PWM strategy varies discretely from an upper value to a lower value and then gradually back to the upper value when the time-varying frequency of the supply network is increasing.

19. The controller according to claim 18, wherein the upper value is substantially equal to the nominal switching frequency of the PWM strategy.

20. The controller according to claim 18, wherein the switching frequency of the PWM strategy varies gradually from an upper value down to a lower value and then discretely back to the upper value when the time-varying frequency of the supply network is decreasing.

21. The controller according to claim 19, wherein the switching frequency of the PWM strategy varies discretely from an upper value to a lower value at each of a first series of discrete frequency values of the supply network when the time-varying frequency of the supply network is increasing and the switching frequency of the PWM strategy varies discretely from a lower value to an upper value at each of a second series of discrete frequency values of the supply network when the time-varying frequency of the supply network is decreasing.

22. The controller according to claim 21, wherein the first series of discrete frequency values of the supply network and the second series of discrete frequency values of the supply network are offset relative to each other.

23. The controller according to claim 13, wherein the switching frequency of the PWM strategy is varied to achieve only integer odd harmonics of the time-varying frequency.

24. The controller according to claim 13, wherein the switching frequency of the PWM strategy is varied to achieve only integer even harmonics of the time-varying frequency.

25. The controller according to claim 13, wherein the network bridge is an active inverter.

26. The controller according to claim 13, wherein the network bridge is an active rectifier.

27. A power converter that can be used to interface to a supply network operating at a time-varying frequency, the power converter comprising a network bridge operating in accordance with a pulse width modulation (PWM) strategy having a switching frequency, a nominal switching frequency and a number of pulses per period, wherein the power converter includes a controller arranged to vary the switching frequency of the PWM strategy in accordance with the time-varying frequency of the supply network to achieve only integer harmonics of the time-varying frequency.

* * * * *